United States Patent
Tanimoto et al.

(10) Patent No.: US 9,396,003 B2
(45) Date of Patent: Jul. 19, 2016

(54) INFORMATION PROVISION SYSTEM, INFORMATION PROVISION METHOD, AND INFORMATION PROVISION PROGRAM

(71) Applicant: Rakuten, Inc., Shinagawa-ku, Tokyo (JP)

(72) Inventors: Hisako Tanimoto, Shinagawa-ku (JP); Hiroyuki Tanjo, Shinagawa-ku (JP); Eiko Mitsui, Shinagawa-ku (JP); Mitsuru Shibata, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 14/364,383

(22) PCT Filed: Dec. 21, 2012

(86) PCT No.: PCT/JP2012/083267
§ 371 (c)(1),
(2) Date: Jun. 11, 2014

(87) PCT Pub. No.: WO2013/179518
PCT Pub. Date: Dec. 5, 2013

(65) Prior Publication Data
US 2014/0351701 A1    Nov. 27, 2014

(30) Foreign Application Priority Data

May 30, 2012    (JP) ................................. 2012-123590

(51) Int. Cl.
*G06F 9/44*    (2006.01)
*G06F 3/048*    (2013.01)
*G06F 3/0481*    (2013.01)

(52) U.S. Cl.
CPC ............ *G06F 9/4446* (2013.01); *G06F 3/0481* (2013.01)

(58) Field of Classification Search
CPC ........................... G06F 9/4446; G06F 3/04895
USPC .......................................... 715/708, 711, 221
See application file for complete search history.

(56) References Cited

U.S. PATENT DOCUMENTS 5,920,313 A * 7/1999 Diedrichsen et al. ......... 715/767
6,687,485 B2 * 2/2004 Hopkins et al. ............... 434/350
(Continued)

FOREIGN PATENT DOCUMENTS

| JP | 2002-7019 A | 1/2002 |
| JP | 2002-73234 A | 3/2002 |
| JP | 2003-241878 A | 8/2003 |

OTHER PUBLICATIONS

International Preliminary Report on Patentability for PCT/JP2012/083267 dated Dec. 11, 2014.

(Continued)

*Primary Examiner* — Andrea Long
(74) *Attorney, Agent, or Firm* — Sughrue Mion, PLLC

(57) ABSTRACT

An information providing system according to an embodiment includes an acquisition unit and a display control unit. The acquisition unit acquires a plurality of help topics corresponding to a plurality of entry fields to be displayed on a screen from a field/topic storage unit that stores help topics corresponding to entry fields. The display control unit displays the plurality of entry fields in an entry area in the screen displayed on a user terminal and displays the plurality of help topics acquired by the acquisition unit in a help area in the screen. When a field/topic displayed in one of the entry area and the help area is specified, the display control unit makes a display mode of a field/topic in the other area corresponding to the specified field/topic different from a display mode of the other fields/topics in the other area.

10 Claims, 21 Drawing Sheets

(56) References Cited

U.S. PATENT DOCUMENTS

| | | | |
|---|---|---|---|
| 7,865,829 B1* | 1/2011 | Goldfield et al. | 715/708 |
| 2002/0078467 A1* | 6/2002 | Rosin et al. | 725/110 |
| 2007/0220429 A1* | 9/2007 | Kureshy et al. | 715/708 |
| 2007/0226650 A1* | 9/2007 | Hintermeister et al. | 715/822 |
| 2008/0028289 A1* | 1/2008 | Hicks et al. | 715/224 |
| 2008/0215976 A1* | 9/2008 | Bierner et al. | 715/708 |
| 2009/0192836 A1* | 7/2009 | Kelly | 705/7 |
| 2010/0037158 A1* | 2/2010 | Commarford et al. | 715/764 |
| 2011/0289409 A1* | 11/2011 | Batey | G06F 9/4446 715/705 |

OTHER PUBLICATIONS

Japanese Office Action for JP2012-123590 dated Sep. 25, 2012.
International Search Report for PCT/JP2012/083627 dated Jan. 22, 2013.

* cited by examiner

Fig. 2

| PAGE IDENTIFIER | ENTRY FIELD | HELP TOPIC |
|---|---|---|
| P01 (FIRST PAGE) | Model | Reference number indicating the car name, engine type etc. ... |
| | Maker | Select the automaker's name ... |
| | Car name | Select the car name to obtain insurance ... |
| | First registration date | Year and month when your car was first registered and inspected by national authorities ... |
| | Purpose of use | ·Business<br>When using the car for purpose of sales etc. for 15 days or more per month<br>·Commute<br>When using the car for commute to office or school for 15 days or more per month<br>·Daily and leisure<br>When not applicable to any of the above two; when using the car for shopping, travel etc. |
| | ... | ... |
| P02 (SECOND PAGE) | Current insurance ownership | Select whether you currently have voluntary insurance ... |
| | Expiration date | Enter the last day of period of insurance ... |
| | Insurance company | Select the insurance company you currently use ... |
| | ... | ... |
| ... | ... | ... |

Fig. 3

| USER IDENTIFIER | ANSWER | | | | | | | |
|---|---|---|---|---|---|---|---|---|
| | About your car | | | | | About your current insurance contract | | |
| | Model | Maker | Car name | First registration date | Purpose of use | ... | Insurance policy | Expiration date | Insurance company | ... |
| U001 | ABC | Maker Ma | Car Ca | March 2009 | Commute | ... | Yes | August 5, 2012 | Company Hb | ... |
| U002 | DEF | Maker Mc | Car Cb | April 2006 | Daily and leisure | ... | Yes | December 2, 2012 | Company Ha | ... |
| ... | ... | ... | ... | ... | ... | ... | ... | ... | ... | ... |

CAR INSURANCE QUOTE

Step1 | Step2 | Step3 | Step4 | Step5

Step1 About your car

| Select choice method | ○ Model  ○ Maker and Car name |

Help

About maker
About car name
About model

Reference number indicating the car name, engine type etc.

About first registration date
About purpose of use
About estimated annual mileage Next

CAR INSURANCE QUOTE

Step1 > Step2 > Step3 > Step4 > Step5

Step1 About your car

| Select choice method | ○ Model  ● Maker and Car name |

Select maker  [Select]

Help
About maker
Select the maker name of car to obtain insurance

About car name
About model
About first registration date
About purpose of use
About estimated annual mileage

[Next]

CAR INSURANCE QUOTE

Step1 | Step2 | Step3 | Step4 | Step5

Step1 About your car

Select choice method: ○ Model  ● Maker and Car name

Select maker: [Select]

Select maker
○ Maker Ma  ○ Maker Mb  ○ Maker Mc
○ Maker Md  ○ Maker Me  ○ Maker Mf

[Cancel] [Enter]

Help
About maker
Select the maker name of car to obtain insurance

About car name
About model
About first registration date
About purpose of use
About estimated annual mileage

[Next]

CAR INSURANCE QUOTE

Step1 > Step2 > Step3 > Step4 > Step5

Step1  About your car

Select choice method    ○ Model  ● Maker and Car name

Select maker    Maker M/a  [Correct]

Select car name   [Select]

Next

Help
About maker
About car name
Select the car name to obtain insurance

About model
About first registration date
About purpose of use
About estimated annual mileage

CAR INSURANCE QUOTE

| Step1 | Step2 | Step3 | Step4 | Step5 |

Step1  About your car

Select choice method    ○Model  ●Maker and Car name

Select maker        Maker Ma    [Correct]
Select car name     Car Ca      [Correct]
Select model        [Select]

Help
About maker
About car name
About model
Reference number indicating the car name, engine type etc.

About first registration date
About purpose of use
About estimated annual mileage

[Next]

CAR INSURANCE QUOTE

Step1 > Step2 > Step3 > Step4 > Step5

Step1 About your car

Select choice method ○ Model ⦿ Maker and Car name

Select maker | Maker Ma | Correct
Select car name | Car Ca | Correct
Select model | ABC | Correct
Select first registration date | ▼ - - - ▼

Help
About maker
About car name
About model
About first registration date
Year and month when your car was first registered and inspected by national authorities About purpose of use
About estimated annual mileage Next

Fig. 12

CAR INSURANCE QUOTE

| Step1 | Step2 | Step3 | Step4 | Step5 |

Step1　About your car

| Select choice method | ○Model　◉Maker and Car name |

| Select maker | Maker Ma | Correct |
| Select car name | Car Ca | Correct |
| Select model | ABC | Correct |
| Select first registration date | 2012 ▼ Jan. ▼ | |
| Select purpose of use | ○Business ○Commute ○Daily and Leisure | |
| Select estimated annual mileage | Select ▼ | |

Next

Help

About maker
About car name
About model
About first registration date
About purpose of use
Select the purpose of use of car
[Description of choices]
- Business
When using the car for purpose of sales etc. for 15 days or more per month
- Commute
When using the car for commute to office or school for 15 days or more per month
- Daily and Leisure
When not applicable to any of the above two when using the car for shopping, travel etc.

About estimated annual mileage

CAR INSURANCE QUOTE

| Step1 | Step2 | Step3 | Step4 | Step5 |

Step1  About your car

Select choice method          ○ Model    ⊙ Maker and Car name

Select maker            Maker Ma    [Correct]

Select car name         Car Ca      [Correct]

Select model            ABC         [Correct]

Select first registration date   2012  [Jan ▼]

Select purpose of use    ○ Business  ○ Commute  ⊙ Daily and Leisure

Select estimated annual mileage   [Select ▼]

[Next]

Help
About maker
About car name
About model
About first registration date
About purpose of use
About estimated annual mileage
[Reference data]
- 3000 km or less
  Not refueled every month
- 3000 to 5000 km
  Refueled almost every month

Fig. 14

CAR INSURANCE QUOTE

| Step1 | Step2 | Step3 | Step4 | Step5 |

Step2  About your current insurance contract

Do you currently have voluntary insurance?  ○Yes  ○No

Help

About insurance ownership

Select whether you currently have car insurance

About expiration date

About insurance company

Return    Next

CAR INSURANCE QUOTE

Step1 | Step2 | Step3 | Step4 | Step5

Step2  About your current insurance contract

Do you currently have voluntary insurance?  ⦿Yes  ○No

Select expiration date  [ ▼ ] - [ ▼ ] - [ ▼ ]

Select insurance company  [Select]

Help
About insurance ownership
About expiration date
The last day of period of insurance
(the day when insurance expires)

About insurance company

Return    Next

CAR INSURANCE QUOTE

| Step1 | Step2 | Step3 | Step4 | Step5 |

Step2  About your current insurance contract

Do you currently have voluntary insurance?   ⦿ Yes   ○ No

Select expiration date   [2012 ▼] [Oct ▼] [10 ▼]

Select insurance company   [Select]

Help
- About insurance ownership
- About expiration date
- About insurance company Select the insurance company you currently use

[Return]   [Next]

CAR INSURANCE QUOTE

| Step1 | Step2 | Step3 | Step4 | Step5 |

Step1  About your car

| Select choice method | ○ Model   ● Maker and Car name |

Help
About maker
About car name

| Select maker | Maker Ma | Correct |
| Select car name | Car Ca | Correct |

About model
Reference number indicating the car name, engine type etc.

| Select model | ABC | Correct |
| Select first registration date | 2012 ▼ | Jan. ▼ |

About first registration date

| Select purpose of use | ○ Business  ○ Commute  ● Daily and Leisure |

About purpose of use

| Select estimated annual mileage | Select ▼ |

About estimated annual mileage

Next

41

INFORMATION PROVISION SYSTEM, INFORMATION PROVISION METHOD, AND INFORMATION PROVISION PROGRAM

CROSS REFERENCE TO RELATED APPLICATIONS

This application is a National Stage of International Application No. PCT/JP2012/083267 filed Dec. 21, 2012, claiming priority based on Japanese Patent Application No. 2012-123590 filed May 30, 2012, the contents of all of which are incorporated herein by reference in their entirety.

TECHNICAL FIELD

One embodiment of the present invention relates to an information providing system, an information providing method and an information providing program that display help for entry fields.

BACKGROUND ART

Techniques to display help for entry fields have been known. For example, a device that displays a description (hint) for a selected document icon in popup by placing a cursor and left-clicking on one of a plurality of document icons is disclosed in Patent Literature 1 below.

CITATION LIST

Patent Literature

PTL 1: JP 2002-073234 A

SUMMARY OF INVENTION

Technical Problem

By the mechanism disclosed in the above Patent Literature 1, a user can see help for one entry field selected by oneself. However, a user cannot know in advance for which entry field help is prepared and needs to select each entry field one by one to find it. It is therefore demanded to let a user easily find help for each of a plurality of entry fields.

Solution to Problem

An information providing system according to one aspect of the present invention includes an acquisition unit configured to acquire a plurality of help topics corresponding to a plurality of entry fields to be displayed on a screen from a field/topic storage unit that stores help topics corresponding to entry fields, and a display control unit configured to display the plurality of entry fields in an entry area in the screen displayed on a user terminal and display the plurality of help topics acquired by the acquisition unit in a help area in the screen, wherein when an entry field in the entry area is specified, the display control unit makes a display mode of a help topic in the help area corresponding to the entry field different from a display mode of other help topics, displays detailed information for the help topic in the help area corresponding to the specified entry field and displays topic identification information without displaying detailed information for the other help topics.

An information providing method according to one aspect of the present invention is an information providing method executed by an information providing system, the method including an acquisition step of acquiring a plurality of help topics corresponding to a plurality of entry fields to be displayed on a screen from a field/topic storage unit that stores help topics corresponding to entry fields, and a display control step of displaying the plurality of entry fields in an entry area in the screen displayed on a user terminal and displaying the plurality of help topics acquired in the acquisition step in a help area in the screen, wherein when an entry field in the entry area is specified, the display control step makes a display mode of a help topic in the help area corresponding to the entry field different from a display mode of other help topics, displays detailed information for the help topic in the help area corresponding to the specified entry field and displays topic identification information without displaying detailed information for the other help topics.

An information providing program according to one aspect of the present invention causes a computer to implement an acquisition unit configured to acquire a plurality of help topics corresponding to a plurality of entry fields to be displayed on a screen from a field/topic storage unit that stores help topics corresponding to entry fields, and a display control unit configured to display the plurality of entry fields in an entry area in the screen displayed on a user terminal and display the plurality of help topics acquired by the acquisition unit in a help area in the screen, wherein when an entry field in the entry area is specified, the display control unit makes a display mode of a help topic in the help area corresponding to the entry field different from a display mode of other help topics, displays detailed information for the help topic in the help area corresponding to the specified entry field and displays topic identification information without displaying detailed information for the other help topics.

According to the above aspect, a plurality of entry fields and a plurality of help topics that are associated with each other are displayed in one screen, and when a specific entry field (or help topic) is selected, a help topic (or entry field) corresponding to that is displayed in the way different from the other help topics (or the other entry fields). Accordingly, a user can see a plurality of help topics corresponding to a plurality of entry fields in one screen and can easily know the topic corresponding to the field selected by the user. It is thus possible to let a user easily find help for each of a plurality of entry fields. Further, a user can easily know the help topic corresponding to the entry field selected by the user. Further, a user can easily see the details of help for the currently specified entry field without performing any operation and can smoothly enter information. Furthermore, because the details of help are displayed only for the specified entry field, the help can be displayed in a simple manner.

An information providing system according to one aspect of the present invention includes an acquisition unit configured to acquire a plurality of help topics corresponding to a plurality of entry fields to be displayed on a screen from a field/topic storage unit that stores help topics corresponding to entry fields, and a display control unit configured to display the plurality of entry fields in an entry area in the screen displayed on a user terminal and display the plurality of help topics acquired by the acquisition unit in a help area in the screen, wherein when a help topic in the help area is specified, the display control unit makes a display mode of an entry field in the entry area corresponding to the help topic different from a display mode of other entry fields.

An information providing method according to one aspect of the present invention is an information providing method executed by an information providing system, the method including an acquisition step of acquiring a plurality of help topics corresponding to a plurality of entry fields to be displayed on a screen from a field/topic storage unit that stores help topics corresponding to entry fields, and a display control step of displaying the plurality of entry fields in an entry area in the screen displayed on a user terminal and displaying the plurality of help topics acquired in the acquisition step in a help area in the screen, wherein when a help topic in the help area is specified, the display control step makes a display mode of an entry field in the entry area corresponding to the help topic different from a display mode of other entry fields.

An information providing program according to one aspect of the present invention causes a computer to implement an acquisition unit configured to acquire a plurality of help topics corresponding to a plurality of entry fields to be displayed on a screen from a field/topic storage unit that stores help topics corresponding to entry fields, and a display control unit configured to display the plurality of entry fields in an entry area in the screen displayed on a user terminal and display the plurality of help topics acquired by the acquisition unit in a help area in the screen, wherein when a help topic in the help area is specified, the display control unit makes a display mode of an entry field in the entry area corresponding to the help topic different from a display mode of other entry fields.

According to the above aspect, a plurality of entry fields and a plurality of help topics that are associated with each other are displayed in one screen, and when a specific entry field (or help topic) is selected, a help topic (or entry field) corresponding to that is displayed in the way different from the other help topics (or the other entry fields). Accordingly, a user can see a plurality of help topics corresponding to a plurality of entry fields in one screen and can easily know the topic corresponding to the field selected by the user. It is thus possible to let a user easily find help for each of a plurality of entry fields. Further, a user can easily know the entry field corresponding to the help topic selected by the user.

An information providing system according to one aspect of the present invention includes an acquisition unit configured to acquire a plurality of help topics corresponding to a plurality of entry fields to be displayed on a screen from a field/topic storage unit that stores help topics corresponding to entry fields, and a display control unit configured to display the plurality of entry fields in an entry area in the screen displayed on a user terminal and display the plurality of help topics acquired by the acquisition unit in a help area in the screen, wherein when an entry field in the entry area is specified, the display control unit makes a display mode of a help topic in the help area corresponding to the entry field different from a display mode of other help topics, with the plurality of help topics remaining displayed to be able to be specified.

An information providing method according to one aspect of the present invention is an information providing method executed by an information providing system, the method including an acquisition step of acquiring a plurality of help topics corresponding to a plurality of entry fields to be displayed on a screen from a field/topic storage unit that stores help topics corresponding to entry fields, and a display control step of displaying the plurality of entry fields in an entry area in the screen displayed on a user terminal and displaying the plurality of help topics acquired in the acquisition step in a help area in the screen, wherein when an entry field in the entry area is specified, the display control step makes a display mode of a help topic in the help area corresponding to the entry field different from a display mode of other help topics, with the plurality of help topics remaining displayed to be able to be specified.

An information providing program according to one aspect of the present invention causes a computer to implement an acquisition unit configured to acquire a plurality of help topics corresponding to a plurality of entry fields to be displayed on a screen from a field/topic storage unit that stores help topics corresponding to entry fields, and a display control unit configured to display the plurality of entry fields in an entry area in the screen displayed on a user terminal and display the plurality of help topics acquired by the acquisition unit in a help area in the screen, wherein when an entry field in the entry area is specified, the display control unit makes a display mode of a help topic in the help area corresponding to the entry field different from a display mode of other help topics, with the plurality of help topics remaining displayed to be able to be specified.

According to the above aspect, a plurality of entry fields and a plurality of help topics that are associated with each other are displayed in one screen, and when a specific entry field (or help topic) is selected, a help topic (or entry field) corresponding to that is displayed in the way different from the other help topics (or the other entry fields). Accordingly, a user can see a plurality of help topics corresponding to a plurality of entry fields in one screen and can easily know the topic corresponding to the field selected by the user. It is thus possible to let a user easily find help for each of a plurality of entry fields. Further, a user can easily know the entry field corresponding to the help topic selected by the user.

In the information providing system according to another aspect, in response to completion of entry in one entry field, the display control unit may further display the next entry field in the entry area and specify the next entry field, and make a display mode of a help topic in the help area corresponding to the next entry field different from a display mode of other help topics. Entry fields are displayed sequentially in accordance with the progress of entry, and the help topic for the next entry field is displayed in the way different from the other help topics, thereby prompting a user to enter information.

In the information providing system according to another aspect, when there is a field not entered among the plurality of entry fields, the display control unit may specify the field not entered and make a display mode of a help topic in the help area corresponding to the field not entered different from a display mode of other help topics. It is thereby possible to prompt a user to enter information to a field not entered and let the user easily find a help topic corresponding to that field.

In the information providing system according to another aspect, the display control unit may display detailed information for the help topic in the help area corresponding to the specified entry field and display topic identification information without displaying detailed information for the other help topics. In this case, a user can easily see the details of help for the currently specified entry field without performing any operation and can smoothly enter information. Further, because the details of help are displayed only for the specified entry field, the help can be displayed in a simple manner.

In the information providing system according to another aspect, when the specified entry field is not entered and detailed information of a help topic in the help area corresponding to the entry field is hidden by user operation, the display control unit may specify a first field not entered among fields not entered that come before the entry field and display detailed information of a help topic in the help area corresponding to the first field not entered. By moving a focus to the first field not entered and displaying the corresponding help in response to an operation to close help, a user is prompted to enter required information, thereby enhancing the user-friendliness of entering information.

In the information providing system according to another aspect, the help topics stored in the field/topic storage unit may include a plurality of help information in accordance with an entered value in a previous entry field, and the display control unit may display help information corresponding to an entered value in a previous entry field of the specified entry field. In this manner, by dynamically editing the help information, it is possible to present only necessary help to a user without displaying help that is not related to the previous entered vale.

In the information providing system according to another aspect, the acquisition unit may refer to an answer storage unit that stores entered values by a plurality of users in the plurality of entry fields and count the entered values by the plurality of users for each of the entry fields, and set a counting result as at least part of the help topics, and the display control unit may display the counting result corresponding to the specified entry field as the detailed information. The trends of answers by other users are thereby shown as help information to a user who is entering information, and therefore the user can fill in the entry field by referring to the trends.

In the information providing system according to another aspect, when a help topic in the help area is specified, the display control unit may make a display mode of an entry field in the entry area corresponding to the help topic different from a display mode of other entry fields. In this case, a user can easily know the entry field corresponding to the help topic selected by the user.

Advantageous Effects of Invention

According to one aspect of the present invention, it is possible to let a user easily find help for each of a plurality of entry fields.

BRIEF DESCRIPTION OF DRAWINGS

FIG. 2 is a diagram showing an example of field/topic information.

FIG. 3 is a diagram showing an example of answer information.

FIG. 6 is a diagram showing a display example of a quote site.

FIG. 7 is a diagram showing a display example of a quote site.

FIG. 8 is a diagram showing a display example of a quote site.

FIG. 9 is a diagram showing a display example of a quote site.

FIG. 10 is a diagram showing a display example of a quote site.

FIG. 11 is a diagram showing a display example of a quote site.

FIG. 12 is a diagram showing a display example of a quote site.

FIG. 13 is a diagram showing a display example of a quote site.

FIG. 14 is a diagram showing a display example of a quote site.

FIG. 15 is a diagram showing a display example of a quote site.

FIG. 16 is a diagram showing a display example of a quote site.

FIG. 17 is a diagram showing a display example of a quote site.

DESCRIPTION OF EMBODIMENTS

An embodiment of the present invention is described hereinafter in detail with reference to the appended drawings. Note that, in the description of the drawings, the same or equivalent elements are denoted by the same reference symbols, and the redundant explanation thereof is omitted.

Figure 1:
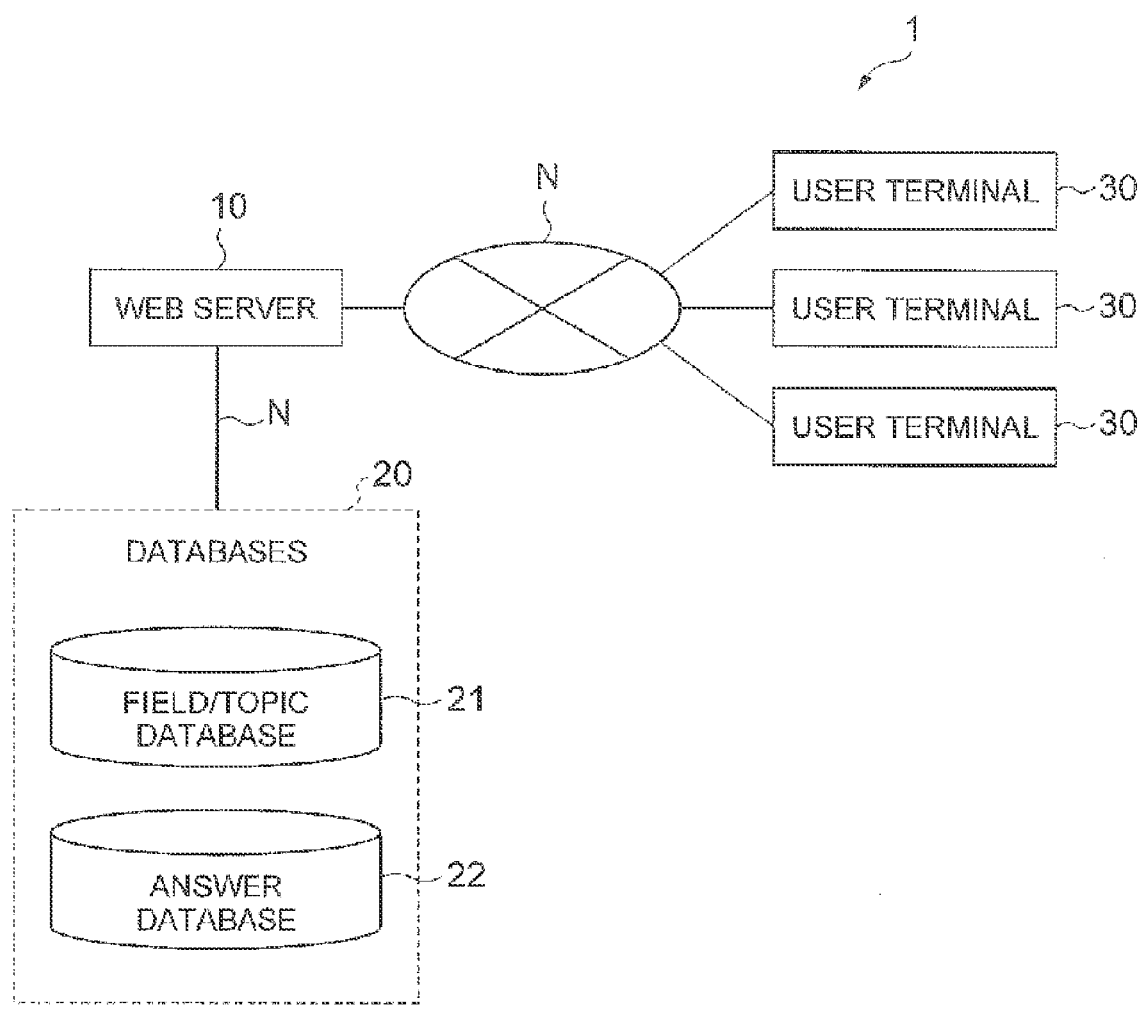
FIG. 1 is a diagram showing an overall configuration of an online quote system according to an embodiment.

In this embodiment, an information providing system according to the present invention is applied to an online quote system 1. First, the functions and configuration of the online quote system 1 according to the embodiment are described with reference to FIGS. 1 to 17. The online quote system 1 is a computer system that provides specified quotes to users via online. In this embodiment, the online quote system 1 is to provide quotes on car insurance; however, the type of quotes is not limited thereto, and the online quote system 1 may provide quotes on any product or service. As shown in FIG. 1, the online quote system 1 includes a web server 10, databases 20, and user terminals 30. Those devices are connected with one another through a communication network N such as the Internet or an intranet.

The web server 10 is a computer system that provides an online quote website (quote site) to a user and creates a quote based on information that is entered through the site. On the quote site, a plurality of entry fields are displayed in each page, and a user fills in those entry fields and requests a quote, during which a user can see help for each of the plurality of entry fields. This embodiment is characterized in the way of displaying help.

The databases 20 are a group of databases that are required for the online quote system 1.

The user terminal 30 is a computer that is owned by a user who intends to get a quote. The variety of the user terminal 30 is not particularly limited, and it may be a stationary or portable personal computer, or a mobile terminal such as an advanced mobile phone (smart phone), a mobile phone or a personal digital assistant (PDA), for example. The number of user terminals 30 in the online quote system 1 is also not limited.

Based on the above assumption, the details of the web server 10 are described hereinbelow. First, various databases that are accessed from the web server 10 are described in detail.

A field/topic database (field/topic storage unit) 21 is a device that stores field/topic information related to entry fields of a quote site. The field/topic information is information in which a page identifier that uniquely identifies a page of a quote site, entry fields that are displayed on the page, and help topics for the entry fields are associated with one another. A plurality of entry fields are associated with one page, and help topics are associated with each of the entry fields. Hereinafter, the help topics are also referred to simply as "help". In this embodiment, the help topics are given information for helping a user enter information, which are, in other words, description, reference information or supplementary information for entry fields.

FIG. 2 shows an example of field/topic information. It is seen from this example that entry fields such as model, maker and car name are displayed on the first page indicated by the page identifier "P01", and entry fields such as insurance ownership, expiration date and insurance company are displayed on the second page indicated by the page identifier "P02". It is also seen that help is prepared for each of the entry fields. For example, help that includes the sentence "Year and month when your car was first registered and inspected by national authorities" is prepared for the entry field "first registration date" on the first page.

Note that each help may be presented in any form. For example, help may be created using text only, help may be created using text and image (still image or moving image), or help may be created using image (still image or moving image) only. Further, in order to change help for the current entry field dynamically in accordance with an answer to the previous entry field (for example, the last or second to last entry field), a plurality of help information may be associated with one entry field, corresponding to an entered value (answer) in that field. Further, help information to be displayed normally and more detailed help information to be displayed in the event of an error at no entry checking may be associated with each entry field.

An answer database (answer storage unit) 22 is a device that stores information (answer information) that is entered by a user to obtain a quote. The answer information is information in which a user identifier that uniquely identifies a user and a plurality of answers by the user corresponding to a plurality of entry fields are associated with each other. FIG. 3 shows an example of answer information. It is seen from this example that a user "U001" has answered "ABC", "maker Ma" and "car Ca" for the model, maker and name of a car and that a user "U002" has answered "December 2, 2012" and "company Ha" for the expiration date and insurance company of the current insurance contract.

The structures of the databases and records described above are not limited to those shown in FIGS. 2 and 3, and each of the databases may be normalized or made redundant.

Figure 4:
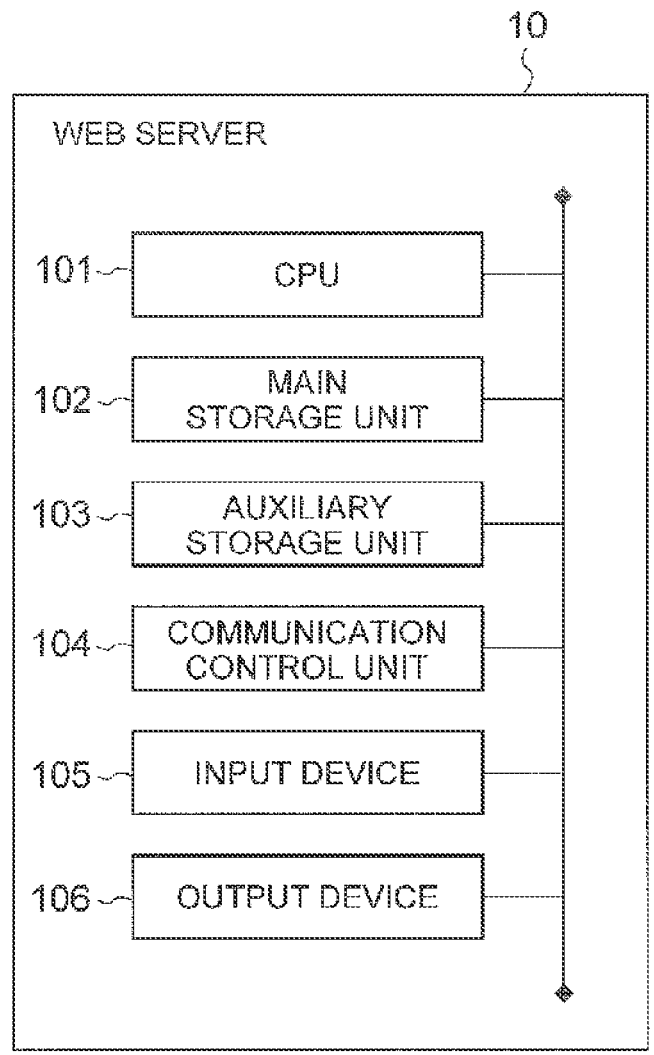
FIG. 4 is a diagram showing a hardware configuration of a web server shown in FIG. 1.

The functions and configuration of the web server 10 are described hereinbelow. FIG. 4 shows the hardware configuration of the web server 10. As shown therein, the web server 10 is composed of a CPU 101 that executes an operating system, an application program and the like, a main storage unit 102 such as ROM and RAM, an auxiliary storage unit 103 such as a hard disk, a communication control unit 104 such as a network card, an input device 105 such as a keyboard and a mouse, and an output device 106 such as a monitor.

The functional components of the web server 10 which is described later are implemented by loading given software onto the CPU 101 or the main storage unit 102, making the communication control unit 104, the input device 105, the output device 106 and the like operate under control of the CPU 101, and performing reading and writing of data in the main storage unit 102 or the auxiliary storage unit 103. The data and database required for processing are stored in the main storage unit 102 or the auxiliary storage unit 103. Note that, although the web server 10 is composed of one computer in the example of FIG. 4, the functions of the web server 10 may be distributed among a plurality of computers.

The user terminal 30 has the hardware configuration similar to that of the web server 10 and therefore the illustration of the hardware configuration of the user terminal 30 is omitted. Note that, however, specific parts can be different between the user terminal 30 and the web server 10, such as that the input device and the output device are implemented by a touch panel in the user terminal 30. In the user terminal 30, like the web server 10, the functional components described below are implemented using hardware.

Figure 5:
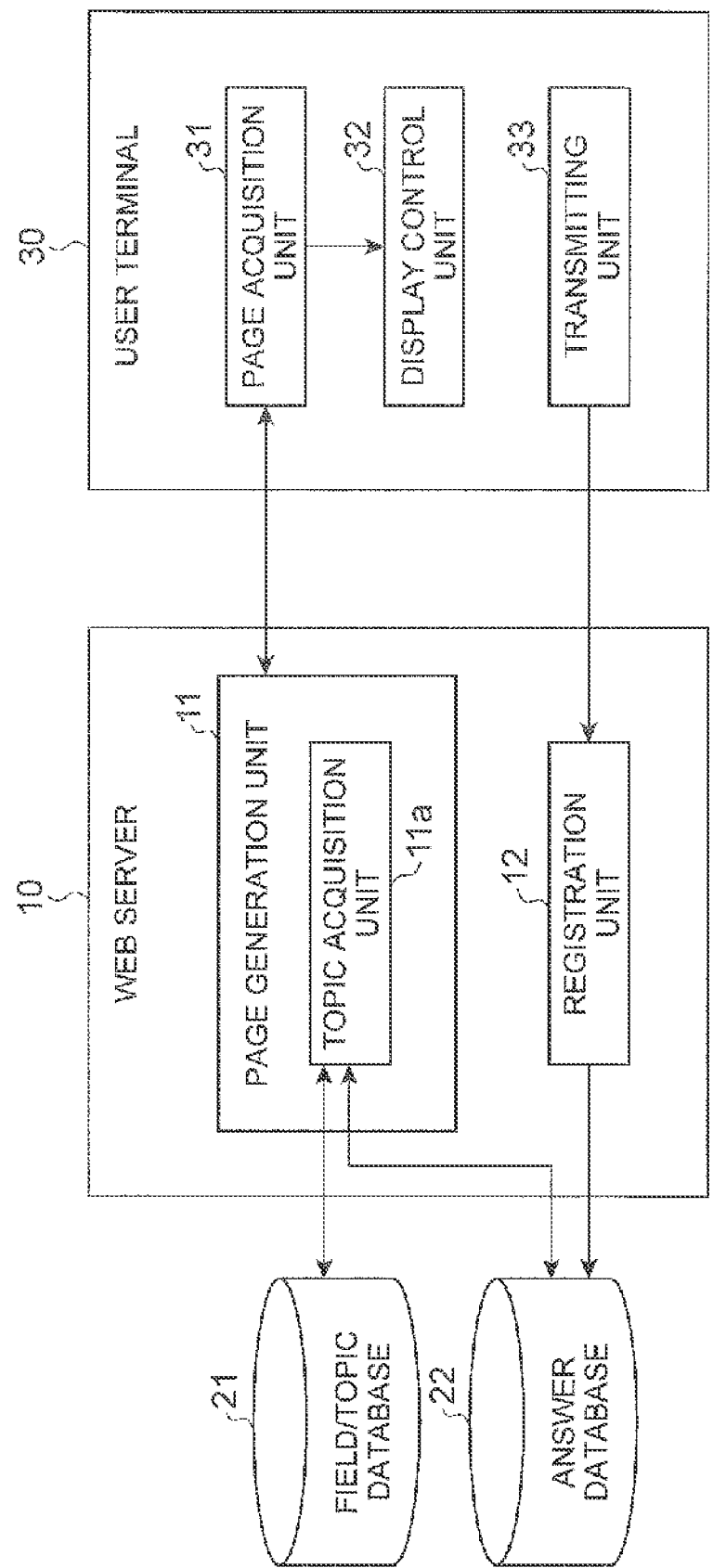
FIG. 5 is a block diagram showing a functional configuration of the online quote system shown in FIG. 1.

As shown in FIG. 5, the web server 10 includes a page generation unit 11 and a registration unit 12 as functional components. The user terminal 30 includes a page acquisition unit 31, a display control unit 32 and a transmitting unit 33 as functional components.

First, the functions of the user terminal 30 are described. The page acquisition unit 31 is a functional element that acquires data (page data) of a quote site from the web server 10. When a user performs an operation to specify a quote site, the page acquisition unit 31 transmits a page request containing the URL (Uniform Resource Locator) of the website to the web server 10. After that, the page acquisition unit 31 receives page data that is transmitted from the web server 10 in response to the HTTP (Hypertext Transfer Protocol) request and outputs the data to the display control unit 32.

The display control unit 32 is a functional element that displays a web page on a monitor of the user terminal 30 and changes the display mode of entry fields or help topics in accordance with a user operation on the page. The display control unit 32 is implemented when HTML (HyperText Markup Language) data and script (for example, JavaScript (registered trademark)) contained in the page data are expanded and executed on the CPU or the main storage unit of the user terminal 30. The quote site is separated into a plurality of pages, and a display screen switches to the next page or the previous page based on the progress of entry or user operation. Each page (screen) includes an entry area (on the left of the page) where a plurality of entry fields are displayed and a help area (on the right of the page) where help for each of the entry fields is displayed.

The display control unit 32 displays detailed information only for a help topic corresponding to an entry field in which information is to be entered by a user (entry field to be filled in by a user) and displays only a title (topic identification information) for help topics related to the other entry fields. Hereinafter, one example of a process to change the display mode of help topics in accordance with switching of fields to be entered is described with reference to FIGS. 6 to 13.

First, the display control unit 32 displays the first page (screen in Step 1) 41 as shown in FIG. 6 based on the page data that is input from the page acquisition unit 31. At the initial display of the first page 41, the display control unit 32 displays only the "choice method" field, which is the first entry field, and specifies this field as the field in which information is to be entered by a user. The display control unit 32 places radio buttons for a user to select whether to enter a model or to enter a maker and a car name in the "choice method" field.

Further, the display control unit 32 displays, in the help area, a plurality of help topics corresponding to a plurality of entry fields included in the first page 41. The display control unit 32 displays detailed information only for help for "model" in the "choice method" field that is specified as the field to be entered and displays only titles for help for the other entry fields.

When a user selects one radio button in the "choice method" field, the display control unit 32 displays the next entry field in accordance with the selection and further displays details of help corresponding to the next field in the help area. For example, when a user selects "maker and car name" as shown in FIG. 7, the display control unit 32 displays the "maker" field, which is the next entry field, and specifies this field as the field to be entered. Then, the display control unit 32 changes the display mode of help for "maker" into detailed display mode and changes the display mode of help for "model" into only title display mode.

When a user presses Select button in the "maker" field, the display control unit 32 opens a modal window 41a as shown in FIG. 8. This window 41a includes a plurality of radio buttons to select one maker from a plurality of candidates for makers, Cancel button to close the modal window 41a without making any selection, and Enter button to confirm the selected maker.

When a user selects one maker and presses Enter button, the display control unit 32 closes the modal window 41a and displays the selected maker name and Correct button to display the modal window 41a again in the "maker" field. Further, the display control unit 32 displays the "car name" field, which is the next entry field, and specifies this field as the next field to be entered and further displays details only for the help topic for "car name". By such control, the first page 41 as shown in FIG. 9 is displayed. To prompt a user to enter a car name, the display control unit 32 provides an entry interface (modal window) just like the case of maker selection to a user.

After a user selects one car name, the display control unit 32 displays the selected car name and Correct button in the "car name" field just like control in the "maker" field. Further, the display control unit 32 displays the "model" field, which is the next entry field, and specifies this field as the field to be entered and displays details only for the help topic for "model". By such control, the first page 41 as shown in FIG. 10 is displayed. To prompt a user to enter a model, the display control unit 32 provides an entry interface just like the case of maker selection and car name selection to a user.

After that, as the field to be entered proceeds from "model" to "first registration date", "purpose of use" and "estimated annual mileage", the display control unit 32 sequentially displays those fields and switches help topics to be displayed in detail in the sequence of "first registration date", "purpose of use" and "estimated annual mileage" (see FIGS. 11 to 13).

In this manner, the display control unit 32 makes the display mode of help for the entry field that is specified as the field to be entered different from that of the other help topics.

When entry in the first page 41 ends, a user presses Next button to display the next page, and then the display control unit 32 determines whether there is a field not entered. When determining that all of the required fields are entered, the display control unit 32 displays the next page, and when determining that there is a field not entered, it specifies that field as the field to be entered. At this time also, the display control unit 32 displays details only for the help topic for the specified field not entered. In the case where there are a plurality of fields not entered, the display control unit 32 sets the field not entered that appears first among those fields as the field to be entered and displays details of help for that field. By such control, it is possible to prompt a user to enter information to the field that is not entered and let the user easily find the help topic corresponding to that field. Note that, in the event that an error occurs at no entry checking as described above, the display control unit 32 may display help information that is more detailed than normal. It is thereby possible to present more detailed description for a field not entered to a user.

The display control unit 32 controls display of entry fields and help topics in each page after the first page 41 in the same manner as those in the first page 41. FIGS. 14 to 16 show some of control of the second page (screen in Step S2) 42. As shown therein, as the field to be entered proceeds from "current insurance ownership" to "expiration date" and "insurance company", the display control unit 32 sequentially displays those fields and switches help topics to be displayed in detail in the sequence of "current insurance ownership", "expiration date" and "insurance company".

As described above, the display control unit 32 displays help in advance along with the progress of entry, and therefore a user can see the help at the point of time when making the next entry. The display control unit 32 can display help in advance by determining that entry has completed at the moment when a radio button is checked, when focus is taken off a text box, or when one value is selected from a list in a combo box, for example.

The display control unit 32 may change help for the entry field specified as the field to be entered dynamically in accordance with an entered value (answer) in the previous entry field. For example, it is assumed that there are an answer Ra and an answer Rb as candidates for an entered value in the previous entry field, and the help topic corresponding to the current entry field includes information Ia corresponding to the answer Ra and information Ib corresponding to the answer Rb. In this case, the display control unit 32 displays only the information Ia as detailed information when the answer Ra is entered, and displays only the information Ib as detailed information when the answer Rb is entered. By controlling the help topic in this manner, it is possible to present only necessary help to a user without displaying help that is not related to the previous entered vale.

In addition to the processing of changing the display mode of a help topic in accordance with switching of an entry field, the display control unit 32 performs the processing of changing the display mode of an entry field in accordance with selection of a help topic by a user.

Specifically, the display control unit 32 highlights only the background of the entry field corresponding to the help topic that is displayed in detail by being selected and does not highlight the background of the other entry fields and thereby makes the display mode of the entry field for which help is displayed different from that of the other entry fields. In the case where a user selects a specific help topic, details are displayed only for that help topic, and only the title is displayed for the help topic that has been displayed in detail before the selection. Accordingly, only one help topic is displayed in detail.

For example, it is assumed that a user clicks (selects) help for "model" when the "estimated annual mileage" field is the field to be entered and help for that field is displayed in detail as shown in FIG. 13. In this case, the display control unit 32 displays details of help for "model" only and highlights the background of the "model" field in the entry area as shown in FIG. 17. After that, when a user clicks (selects) help for the "purpose of use" field, the display control unit 32 displays details of help for that field only, and changes the background of the "model" field in the entry area back to non-highlighted and highlights the background of the "purpose of use" field.

As described above, in the case where one field/topic that is displayed in one of the entry area and the help area is specified, the display control unit 32 makes the display mode of the field/topic that is displayed in the other area and corresponds to that one field/topic different from the display mode of the other fields/topics that are displayed in the other area.

The transmitting unit 33 is a means of transmitting one set of entered answers as answer information to the web server 10 in response to that a user has finished entering required information in the quote site and performed an operation to transmit them.

The functions of the web server 10 are described hereinbelow. The page generation unit 11 is a functional element that generates a web page and provides it to the user terminal 30. Receiving a page request from the user terminal 30, the page generation unit 11 generates a web page of URL indicated by the request and transmits data of that page to the terminal 30. When generating the web page, the page generation unit 11 acquires help for each of entry fields, and thus the page generation unit 11 includes a topic acquisition unit 11a for that processing.

The topic acquisition unit 11a is a functional element that acquires a plurality of help topics corresponding to a plurality of entry fields to be displayed on a screen from the databases 20. The topic acquisition unit 11a performs the acquisition of help topics for each page. There are various methods of acquiring help topics as described below.

The topic acquisition unit 11a may read help topics stored in the field/topic database 21 and embeds the help topics into the web page as they are. In this case, the help topics indicated by the field/topic information are displayed as they are as details of help on the user terminal 30, or details of help that are dynamically edited by the display control unit 32 in accordance with an answer to the previous entry field are displayed.

Alternatively, the topic acquisition unit 11a may add the answer status of users that is obtained by summarizing the answer information in the answer database 22 to the help topics read from the field/topic database 21 and thereby generate final help topics to be presented to a user. The topic acquisition unit 11a summarizes the answers in the answer database 22 which correspond to a given entry field and thereby obtains indexes such as the number of users and an answer rate for each kind of answer.

As one example, assuming that three choices "business", "commute" and "daily and leisure" are prepared for the entry field "purpose of use", the topic acquisition unit 11a counts by how many uses each choice has been selected by referring to the answer database 22. For example, the topic acquisition unit 11a calculates the number of users (or percentage) who have selected "business", "commute" and "daily and leisure" as 10 people (or 12.5%), 20 people (or 25.0%) and 50 people (or 62.5%), respectively. Then, the topic acquisition unit 11a adds the counting result in the form of text, graph or the like to the help topic (see FIG. 12) for "purpose of use" read from the field/topic database 21 and embeds the final help topic obtained by the addition into the web page.

In this manner, by generating help topics dynamically using the answer information, the trends of answers by other users are shown as help information to a user who is entering information, and therefore the user can fill in the entry field by referring to the trends.

The registration unit 12 is a functional element that receives answer information from the user terminal 30 and stores the information into the answer database 22. As described above, the stored answer information can be referred to by the topic acquisition unit 11a.

Figure 19:
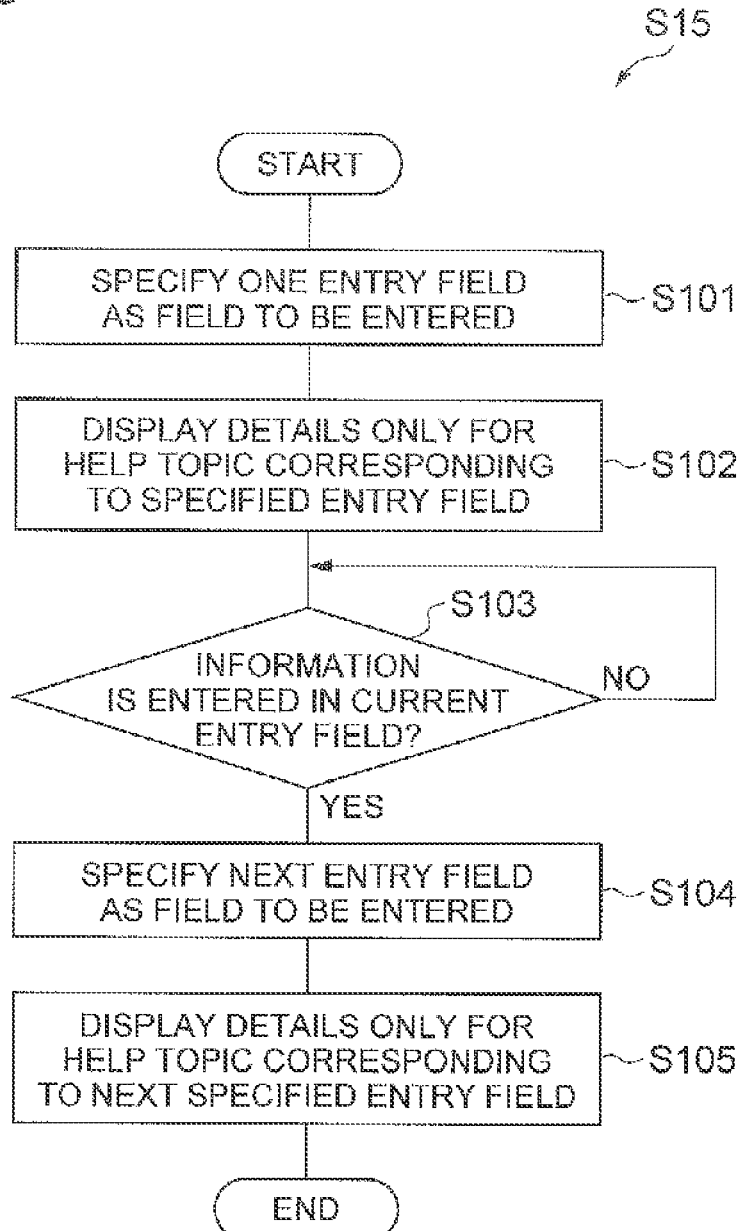
FIG. 19 is a flowchart showing details of display mode control shown in FIG. 18.
Figure 20:
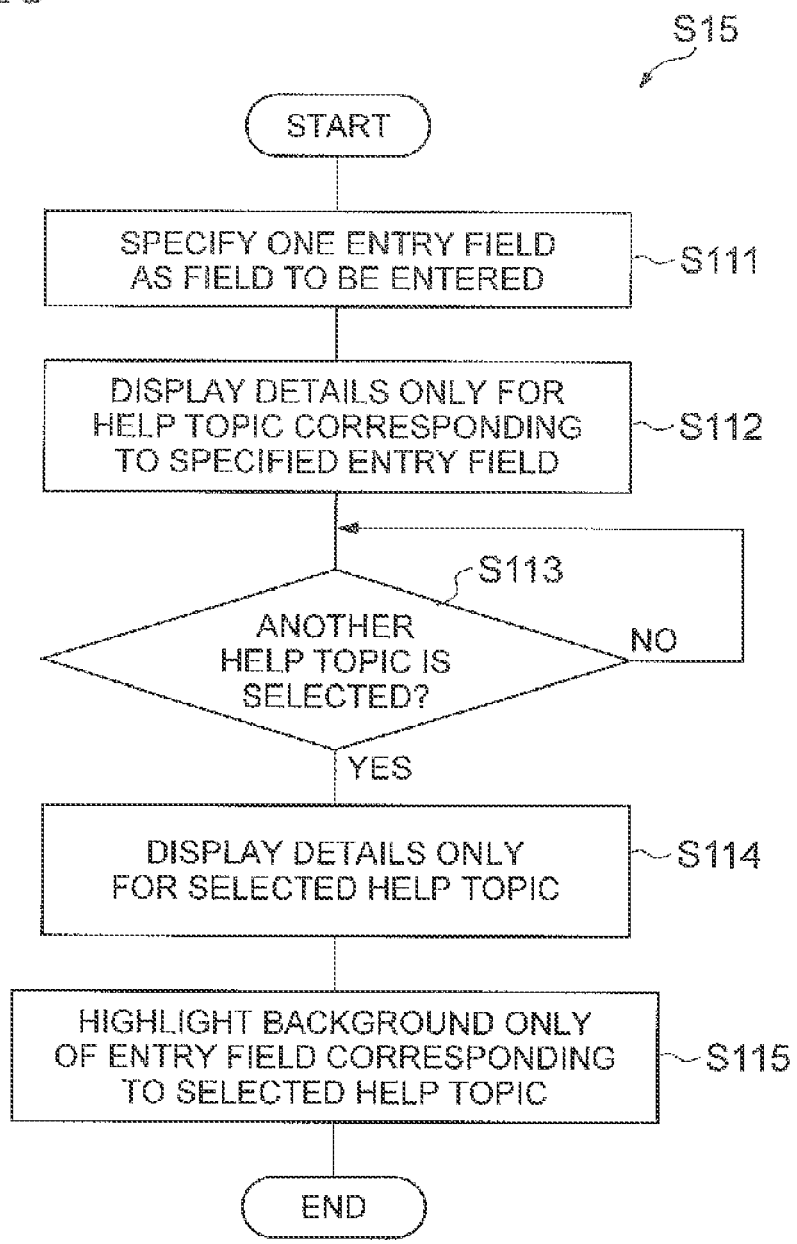
FIG. 20 is a flowchart showing details of display mode control shown in FIG. 18.

Hereinafter, the operation of the online quote system 1 is described and also an information providing method according to this embodiment is described with reference to FIGS. 18 to 20.

Figure 18:
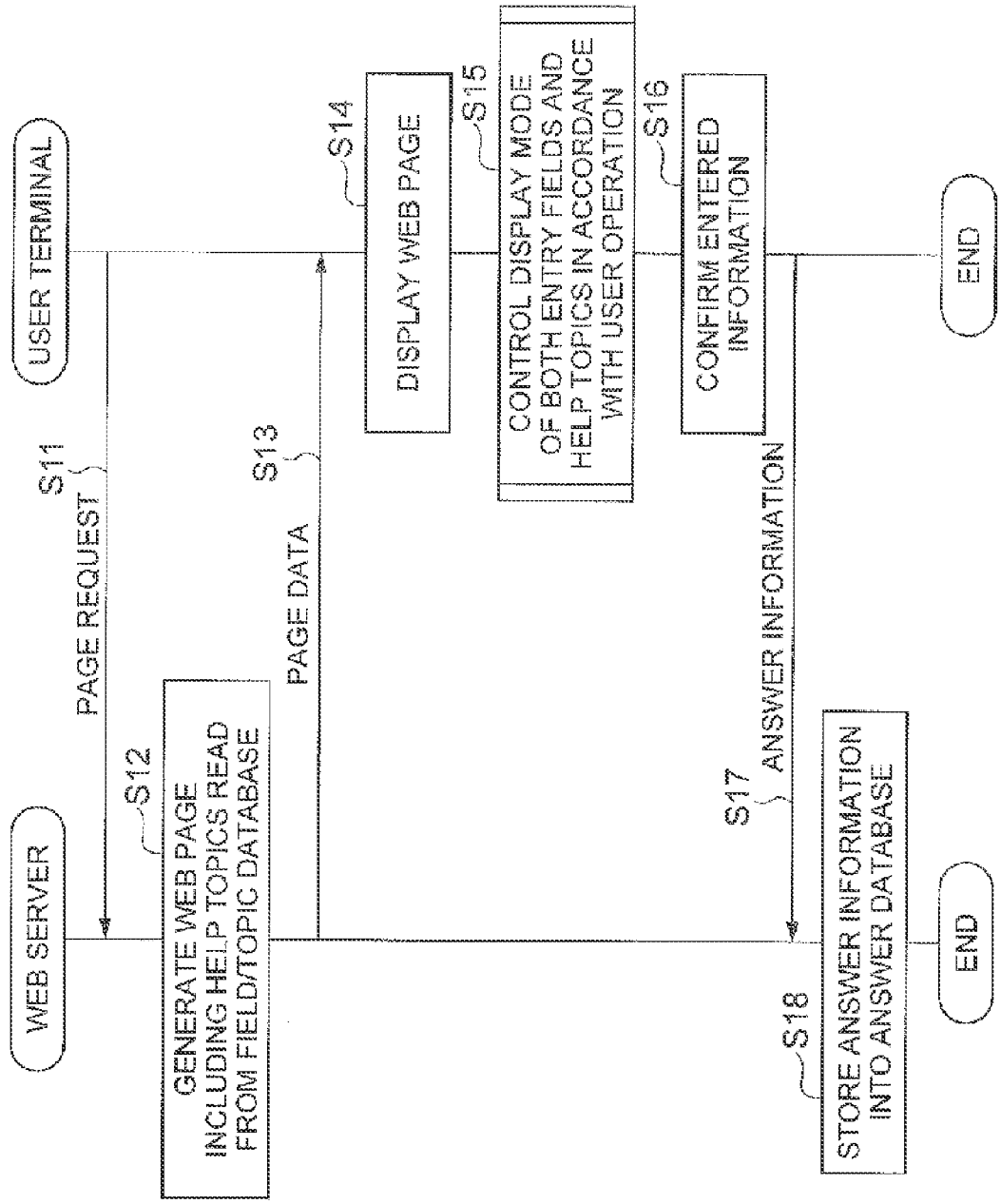
FIG. 18 is a sequence chart showing an operation of the online quote system shown in FIG. 1.

The overall flow is as shown in FIG. 18. When a user performs an operation to access a quote site on the user terminal 30, the page acquisition unit 31 transmits a page request to the web server 10 (Step S11). In the web server 10, the page generation unit 11 generates a web page including help topics read from the field/topic database 21 (Step S12) and transmits page data to the user terminal 30 (Step S13). In Step S12, the topic acquisition unit 11a reads help topics for each of entry fields from the field/topic database 21 and further summarizes answer information in the answer database 22 according to need and thereby acquires a plurality of final help topics to be provided to a user (acquisition step).

In the user terminal 30, the page acquisition unit 31 receives the page data and displays the web page of the quote site (Step S14), and thereby the user can enter information for obtaining a quote. During the time when the user proceeds with entering information, the display control unit 32 controls the display modes of both entry fields and help topics in accordance with a user operation (Step S15, display control step).

When the user has filled in all the required fields and performs an operation to transmit the entered information, the entered information is confirmed (Step S16), and the transmitting unit 33 transmits the entered information as answer information to the web server 10 (Step S17). In the web server 10, the registration unit 12 receives the answer information and stores them into the answer database 22 (Step S18).

The processing of Step S15 is described in detail. First, the processing to change the display mode of the help area when one entry field is specified automatically or by user operation is described with reference to FIG. 19. The display control unit 32 specifies one entry field as the field to be entered (Step S101) and then displays detailed information only for the help topic corresponding to that entry field and displays only titles for the other help topics. After that, the display control unit 32 waits for a user to finish entering information in the currently specified entry field (NO in Step S103). When information is entered in the current entry field (YES in Step S103), the display control unit 32 specifies the next entry field as the field to be entered (Step S104) and then displays detailed information only for the help topic corresponding to the next entry field and displays only titles for the other help topics (Step S105).

The process in the case where a user selects a help topic for which only the title is displayed is described hereinafter with reference to FIG. 20. The processing of Steps S111 and S112 is the same as that of Steps S101 and S102 described above, and the display control unit 32 displays details only for the help topic that is specified as the field to be entered. After that, when a user selects another help topic (YES in Step S113), the display control unit 32 displays details only for the help topic (Step S114) and sets the background of the entry field corresponding to that help topic to a highlighted color and sets the background of the other entry fields to a non-highlighted color (Step S115).

Figure 21:
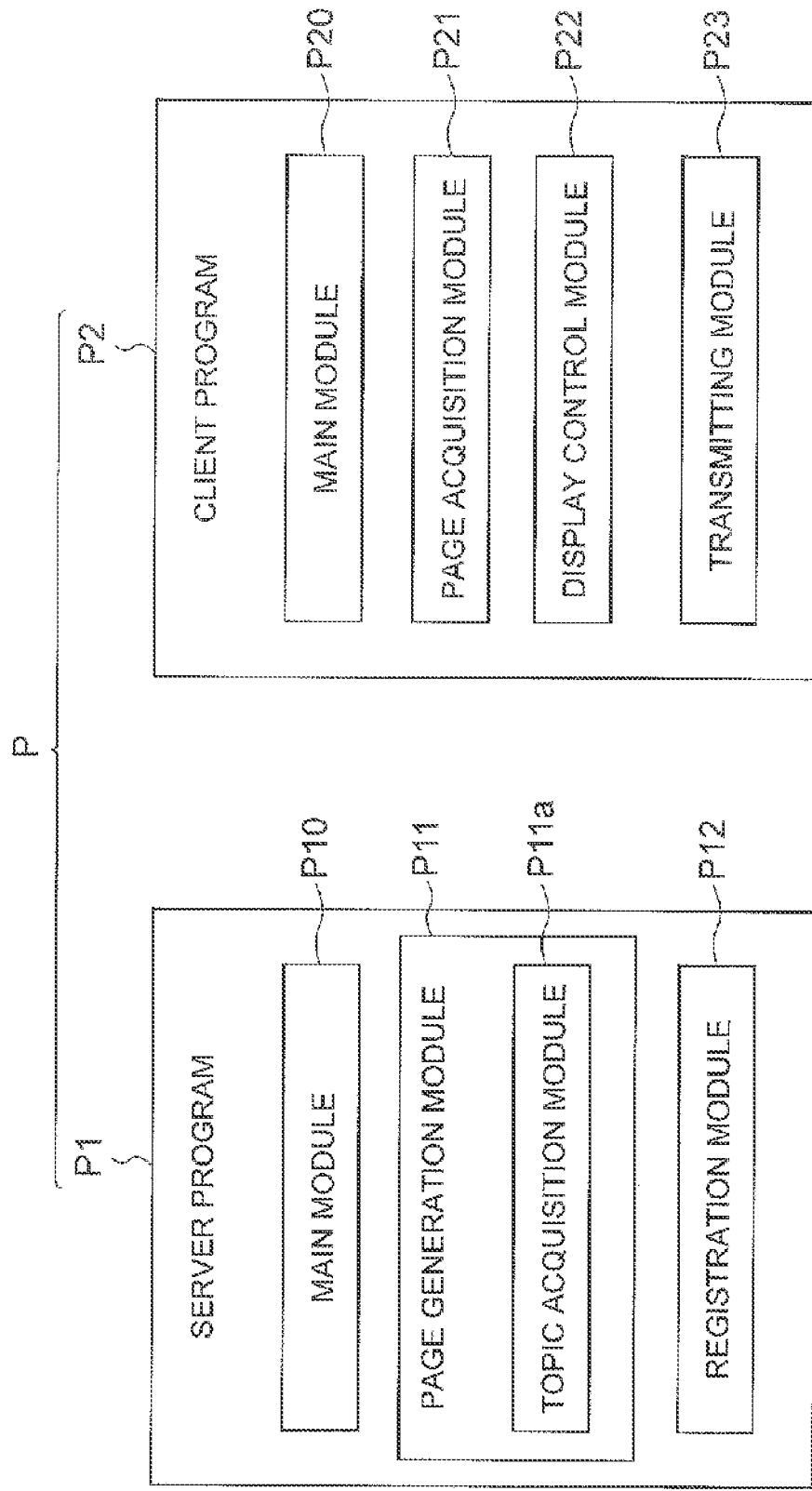
FIG. 21 is a diagram showing a configuration of an information providing program according to an embodiment.

An information providing program P to implement the online quote system 1 is described hereinafter with reference to FIG. 21. The information providing program P includes a server program P1 that causes a computer to function as the web server 10 and a client program P2 that causes a computer to function as the user terminal 30.

The server program P1 includes a main module P10, a page generation module P11, a topic acquisition module P11a and a registration module P12.

The main module P10 is a part that exercises control over the page generation function in the web server 10. The functions implemented by executing the page generation module P11, the topic acquisition module P11a and the registration module P12 are equal to the functions of the page generation unit 11, the topic acquisition unit 11a and the registration unit 12 described above, respectively.

The client program P2 includes a main module P20, a page acquisition module P21, a display control module P22 and a transmitting module P23.

The main module P20 is a part that exercises control over the page display function in the user terminal 30. The functions implemented by executing the page acquisition module P21, the display control module P22 and the transmitting module P23 are equal to the functions of the page acquisition unit 31, the display control unit 32 and the transmitting unit 33 described above, respectively.

Each of the server program P1 and the client program P2 is provided in the form of being recorded in a static manner on a recording medium such as CD-ROM, DVD-ROM or semiconductor memory, for example. Further, the programs P1 and P2 may be provided as a data signal superimposed onto a carrier wave through a communication network.

As described above, according to this embodiment, a plurality of entry fields and a plurality of help topics that are associated with each other are displayed in one screen, and when one entry field (or one help topic) is selected, one help topic (or one entry field) corresponding to that is displayed in the way different from the other help topics (or the other entry fields). Accordingly, a user can see a plurality of help topics corresponding to a plurality of entry fields in one screen and can easily know the topic corresponding to the field selected by the user. It is thus possible to let a user easily find help for each of a plurality of entry fields.

Specifically, because only the help topic corresponding to the specified entry field is displayed in detail, a user can easily see the details of help for the entry field without performing any operation and can smoothly enter information. Further, because the details of help are displayed only for the specified entry field, the help can be displayed in a simple manner. Furthermore, a user can easily know the entry field corresponding to the help topic selected by the user based on a difference in color.

Further, in this embodiment, entry fields are displayed sequentially in accordance with the progress of entry, and the help topic for the next entry field is displayed in the way different from the other help topics, thereby prompting a user to enter information. On the other hand, all of a plurality of help topics in the screen are displayed from the first to the end, thereby allowing a user to see all of a plurality of help topics from the first.

Hereinbefore, the present invention has been described in detail with respect to the embodiment thereof. However, the present invention is not limited to the above-described embodiment. Various changes and modifications may be made therein without departing from the scope of the invention.

In the case where the details of help for a field not entered that is the field to be entered are closed by a user (when it is changed into only title display mode), the display control unit 32 may determine a help topic to be displayed in detail next in accordance with the entry status in the fields that come before the field not entered.

For example, it is assumed that, among entry fields A, B and C that are arranged sequentially, the field A is entered and the fields B and C are not entered, and a user has selected help for the field C and thereby details of only that help are displayed, and therefore the display mode of the entry field C is changed. Then, it is assumed that the user closes help for the entry field C. In this case, the display control unit 32 specifies the entry field B, which is the first field not entered among the fields not entered that come before the entry field C, as the field to be entered and further displays the details of help for the field B. By moving a focus to the first field not entered and displaying the details of the corresponding help in response to an operation to close help, a user is prompted to enter required information, thereby enhancing the user-friendliness of entering information.

In the above-described embodiment, the display control unit 32 displays detailed information for only one help topic and highlights the background of only one entry field. However, the way of making the display mode of one specified topic or field different from the other ones in each of the entry area and the help area may be set arbitrarily. For example, the display control unit 32 may make the font or color of text different between a specific field/topic and the other fields/topics or add a given mark or icon only to a specific field/topic.

Although the online quote system 1 is constructed as the client and server including the web server 10 and the user terminal 30 in the above-described embodiment, the system configuration is not limited thereto. For example, an application program having the equivalent functions to the functional components of the web server 10 may be installed into a user terminal, so that the user terminal directly accesses the databases 20 and acquires the screen as shown in FIGS. 6 to 17. In other words, the information providing system according to the invention can be constructed using one terminal only.

The display control unit 32 may change the display mode of only either one of entry fields and help topics.

As described in the foregoing, the information providing system, the information providing method and the information providing program according to several embodiments of the present invention can be defined as follows.

[Item 1] An information providing system comprising:
an acquisition unit configured to acquire a plurality of help topics corresponding to a plurality of entry fields to be displayed on a screen from a field/topic storage unit that stores help topics corresponding to entry fields; and
a display control unit configured to display the plurality of entry fields in an entry area in the screen displayed on a user terminal and display the plurality of help topics acquired by the acquisition unit in a help area in the screen, wherein
when a field/topic displayed in one of the entry area and the help area is specified, the display control unit makes a display mode of a field/topic in the other area corresponding to the specified field/topic different from a display mode of other fields/topics in the other area.

[Item 2] The information providing system according to Item 1, wherein
when an entry field in the entry area is specified, the display control unit makes a display mode of a help topic in the help area corresponding to the entry field different from a display mode of other help topics.

[Item 3] The information providing system according to Item 2, wherein
in response to completion of entry in one entry field, the display control unit further displays the next entry field in the entry area and specifies the next entry field, and makes a display mode of a help topic in the help area corresponding to the next entry field different from a display mode of other help topics.

[Item 4] The information providing system according to Item 2 or 3, wherein
when there is a field not entered among the plurality of entry fields, the display control unit specifies the field not entered and makes a display mode of a help topic in the help area corresponding to the field not entered different from a display mode of other help topics.

[Item 5] The information providing system according to any one of Items 2 to 4, wherein
the display control unit displays detailed information for the help topic in the help area corresponding to the specified entry field and displays topic identification information without displaying detailed information for the other help topics.

[Item 6] The information providing system according to any one of Items 2 to 5, wherein
when the specified entry field is not entered and detailed information of a help topic in the help area corresponding to the entry field is hidden by user operation, the display control unit specifies a first field not entered among fields not entered that come before the entry field and displays detailed information of a help topic in the help area corresponding to the first field not entered.

[Item 7] The information providing system according to Item 5 or 6, wherein the help topics stored in the field/topic storage unit include a plurality of help information in accordance with an entered value in a previous entry field, and the display control unit displays help information corresponding to an entered value in a previous entry field of the specified entry field.

[Item 8] The information providing system according to any one of Items 5 to 7, wherein the acquisition unit refers to an answer storage unit that stores entered values by a plurality of users in the plurality of entry fields and counts the entered values by the plurality of users for each of the entry fields, and sets a counting result as at least part of the help topics, and the display control unit displays the counting result corresponding to the specified entry field as the detailed information.

[Item 9] The information providing system according to any one of Items 1 to 8, wherein when a help topic in the help area is specified, the display control unit makes a display mode of an entry field in the entry area corresponding to the help topic different from a display mode of other entry fields.

[Item 10] An information providing method executed by an information providing system, comprising:

an acquisition step of acquiring a plurality of help topics corresponding to a plurality of entry fields to be displayed on a screen from a field/topic storage unit that stores help topics corresponding to entry fields; and a display control step of displaying the plurality of entry fields in an entry area in the screen displayed on a user terminal and displaying the plurality of help topics acquired in the acquisition step in a help area in the screen, wherein when a field/topic displayed in one of the entry area and the help area is specified, the display control step makes a display mode of a field/topic in the other area corresponding to the specified field/topic different from a display mode of other fields/topics in the other area.

[Item 11] An information providing program causing a computer to implement:

an acquisition unit configured to acquire a plurality of help topics corresponding to a plurality of entry fields to be displayed on a screen from a field/topic storage unit that stores help topics corresponding to entry fields; and a display control unit configured to display the plurality of entry fields in an entry area in the screen displayed on a user terminal and display the plurality of help topics acquired by the acquisition unit in a help area in the screen, wherein when a field/topic displayed in one of the entry area and the help area is specified, the display control unit makes a display mode of a field/topic in the other area corresponding to the specified field/topic different from a display mode of other fields/topics in the other area.

REFERENCE SIGNS LIST

1 . . . online quote system (information providing system), 10 . . . web server, 11 . . . page generation unit, 11a . . . topic acquisition unit (acquisition unit), 12 . . . registration unit, 20 . . . databases, 21 . . . field/topic database (field/topic storage unit), 22 . . . answer database (answer storage unit), 30 . . . user terminal, 31 . . . page acquisition unit, 32 . . . display control unit, 33 . . . transmitting unit, P . . . information providing program, P1 . . . server program, P1,P2 . . . each program, P10 . . . main module, P11 . . . page generation module, P11a . . . topic acquisition module, P12 . . . registration module, P2 . . . client program, P20 . . . main module, P21 . . . page acquisition module, P22 . . . display control module, P23 . . . transmitting module

The invention claimed is:

1. An information providing system comprising:
at least one memory operable to store program code;
at least one processor operable to read the program code and operate as instructed by the program code, the program code including:
   acquisition code configured to cause the at least one processor to acquire a plurality of help topics corresponding to a plurality of entry fields to be displayed on a screen from a field/topic storage that stores help topics and corresponding entry fields in association with one another; and
   display control code configured to cause the at least one processor to display the plurality of entry fields in an entry area in the screen displayed on a user terminal and concurrently display the plurality of help topics acquired by the acquisition code in a help area in the screen, wherein
when a help topic in the help area is specified, the display control code causes the at least one processor to control a display mode of an entry field in the entry area, which is determined to correspond to the specified help topic by referring to the field/topic storage, to be different from a display mode of other entry fields, and
when there is an entry field that is not entered and detailed information of a help topic in the help area corresponding to the entry field is hidden by a user operation, the display control code causes the at least one processor to specify a first field not entered among fields not entered that come before the entry field and display detailed information of a help topic in the help area corresponding to the first field not entered.

2. An information providing system comprising:
at least one memory operable to store program code;
at least one processor operable to read the program code and operate as instructed by the program code, the program code including:
   acquisition code configured to cause the at least one processor to acquire a plurality of help topics corresponding to a plurality of entry fields to be displayed on a screen from a field/topic storage that stores help topics corresponding to entry fields; and
   display control code configured to cause the at least one processor to display the plurality of entry fields in an entry area in the screen displayed on a user terminal and concurrently display the plurality of help topics acquired by the acquisition code in a help area in the screen, wherein
when an entry field in the entry area is specified in a state in which a help topic corresponding to the specified entry field and other help topics are concurrently displayed in the help area, the display control code causes the at least one processor to control the help topic in the help area corresponding to the specified entry field to be different from a display mode of the other help topics in the help area, with the plurality of help topics remaining displayed to be able to be specified, and when there is an entry field that is not entered and detailed information of a help topic in the help area corresponding to the entry field is hidden by a user operation, the display control code causes the at least one processor to specify a first field not entered among fields not entered that come before the entry field and display detailed information of a help topic in the help area corresponding to the first field not entered.

3. The information providing system according to claim 2, wherein
in response to completion of entry in one entry field, the display control code causes the at least one processor to display the next entry field in the entry area and specify the next entry field, and control a display mode of a help topic in the help area corresponding to the next entry field to be different from a display mode of the other help topics.

4. The information providing system according to claim 2, wherein
when there is a field not entered among the plurality of entry fields, the display control code causes the at least one processor to specify the field not entered and control a display mode of a help topic in the help area corresponding to the field not entered to be different from a display mode of other help topics.

5. The information providing system according to claim 2, wherein
the display control code causes the at least one processor to display detailed information for the help topic in the help area corresponding to the specified entry field and display topic identification information without displaying detailed information for the other help topics.

6. The information providing system according to claim 5, wherein
the help topics stored in the field/topic storage include a plurality of help information in accordance with an entered value in a previous entry field, and
the display control code causes the at least one processor to display help information corresponding to an entered value in a previous entry field of the specified entry field.

7. The information providing system according to claim 5, wherein
the acquisition code causes the at least one processor to refer to an answer storage that stores entered values by a plurality of users in the plurality of entry fields and count the entered values by the plurality of users for each of the entry fields, and set a counting result as at least part of the help topics, and
the display control code causes the at least one processor to display the counting result corresponding to the specified entry field as the detailed information.

8. The information providing system according to claim 2, wherein
when a help topic in the help area is specified, the display control code causes the at least one processor to control a display mode of an entry field in the entry area corresponding to the help topic to be different from a display mode of other entry fields.

9. An information providing method executed by an information providing system, including at least one processor, comprising:
acquiring, using at least one of said at least one processor, a plurality of help topics corresponding to a plurality of entry fields to be displayed on a screen from a field/topic storage that stores help topics and corresponding entry fields in association with one another; and
displaying, using at least one of said at least one processor, the plurality of entry fields in an entry area in the screen displayed on a user terminal and concurrently displaying the plurality of acquired help topics in a help area in the screen, wherein
when a help topic in the help area is specified, the display control step controls a display mode of an entry field in the entry area, which is determined to correspond to the specified help topic by referring to the field/topic storage, to be different from a display mode of other entry fields, and
when there is an entry field that is not entered and detailed information of a help topic in the help area corresponding to the entry field is hidden by a user operation, the display control code causes the at least one processor to specify a first field not entered among fields not entered that come before the entry field and display detailed information of a help topic in the help area corresponding to the first field not entered.

10. An information providing method executed by an information providing system, including at least one processor, comprising:
acquiring, using at least one of said at least one processor, a plurality of help topics corresponding to a plurality of entry fields to be displayed on a screen from a field/topic storage that stores help topics corresponding to entry fields; and
displaying, using at least one of said at least one processor, the plurality of entry fields in an entry area in the screen displayed on a user terminal and concurrently displaying the plurality of acquired help topics in a help area in the screen, wherein
when an entry field in the entry area is specified in a state in which a help topic corresponding to the specified entry field and other help topics are concurrently displayed in the help area, the display control step controls a display mode of the help topic in the help area corresponding to the specified entry field to be different from a display mode of the other help topics in the help area, with the plurality of help topics remaining displayed to be able to be specified, and
when there is an entry field that is not entered and detailed information of a help topic in the help area corresponding to the entry field is hidden by a user operation, the display control code causes the at least one processor to specify a first field not entered among fields not entered that come before the entry field and display detailed information of a help topic in the help area corresponding to the first field not entered.

* * * * *